June 13, 1967 D. G. MORRISON 3,324,962
FORCE MEASURING SYSTEM WITH ELECTRONIC
BALANCING AND READOUT NETWORK
Filed Feb. 14, 1964 2 Sheets-Sheet 1

INVENTOR.
DONALD G. MORRISON
BY Robert B. Harmon
ATTORNEY

INVENTOR.
DONALD G. MORRISON
BY Robert B. Harmon
ATTORNEY

United States Patent Office 3,324,962
Patented June 13, 1967

3,324,962
FORCE MEASURING SYSTEM WITH ELECTRONIC BALANCING AND READOUT NETWORK
Donald G. Morrison, Rock Island, Ill., assignor to Fairbanks, Morse & Co., New York, N.Y., a corporation of Illinois
Filed Feb. 14, 1964, Ser. No. 344,985
15 Claims. (Cl. 177—210)

This invention relates generally to force measuring systems and more particularly to an electronic balancing and readout network for determining and displaying the magnitude of a force. Such a system may be used for measurement of a force per se, or for the determination of a quantity related to force by interpolation of the force parameter prior to readout to provide an indication of the magnitude of the related quantity such as pressure, displacement, or weight.

In accordance with the present invention, a force measuring system is provided which utilizes an electronic network for processing a signal derived from a transducer to which the force to be measured is applied. The signal processing network employs a feedback arrangement whereby the feedback signal opposes the output signal from the transducer to produce a null or balance when the two signals are equal in magnitude but opposite in polarity such that the force indication is derived from a highly accurate close loop system. In the preferred embodiment to be described the apparatus constitutes a weighing system, but as previously stated the display means may be adapted to provide a measure of other quantities.

Mechanical units previously employed as weighing scale systems have provided relatively high accuracy but have suffered generally from the disadvantages of being bulky and complex in addition to being relatively slow in terms of response time between application of the weight to be measured to the system and indication thereof. Similarly electrical weighing systems heretofore devised have suffered from various defects. For example, although such systems have relatively fast response to individual weighings in comparison with mechanical systems, and have provided some reduction in physical size of the overall device, nevertheless problems have accrued with respect to stability, complexity, and accuracy.

The present invention, however, provides an electronic weighing system having very rapid response time (one second or less for individual weighings) and extremly high accuracy (plus or minus one-tenth of one percent), along with linear operation, and relatively low power requirements, with the system maintaining these advantages over a relatively wide range of operating temperatures.

The aforementioned advantages are attained by the use of an electronic system wherein one or more load cells are suitably attached to a movable member, for example a platform, to provide a D.-C. output signal proportional to the magnitude of the weight applied to the movable member. The D.-C. signal is then converted to an A.-C. waveform which is amplified and rectified, the resultant D.-C. level being applied to a voltage controlled oscillator having an output consisting of an A.-C. signal of a frequency proportional to the D.-C. level. The A.-C. signal frequency is translated to a direct voltage in accordance therewith and fed back to a summing junction in opposition to the original D.-C. signal derived from the load cells whereby a balance is obtained. The output of the voltage controlled oscillator, which is maintained at the frequency occurring at balance, is applied to an electronic gated counter having a preselected time base. The counter counts each cycle of the frequency applied and provides a binary coded decimal (BCD) output which is decoded by binary to digital conversion for application to a display device which provides an indication of the weight under observation. Accuracy, linearity, and stability of the system are features to be hereinafter discussed.

It is therefore a principal object of this invention to provide an improved electronic force measuring system.

It is another object of this invention to provide an improved weighing system utilizing an electronic network wherein rapid response is combined with stability and linearity to produce an accurate indication of the weight under observation.

It is a further object of this invention to provide an improved force measuring network which utilizes an electronic system for converting the force to be measured to an electronic signal, and wherein the force indication is obtained from a highly accurate closed loop arrangement.

It is a still further object of this invention to provide an improved force measuring system wherein a D.-C. signal is derived from, and is proportional to, the force applied to the system, which signal is thereafter converted to an A.-C. waveform having a frequency directly related to the magnitude of said D.-C. signal whereby a measurement of the frequency provides an indication of the magnitude of the force under observation.

Other objects, features and attendant advantages of this invention will become apparent from a consideration of the following description taken in conjunction with the accompanying drawings in which.

Figure 1:
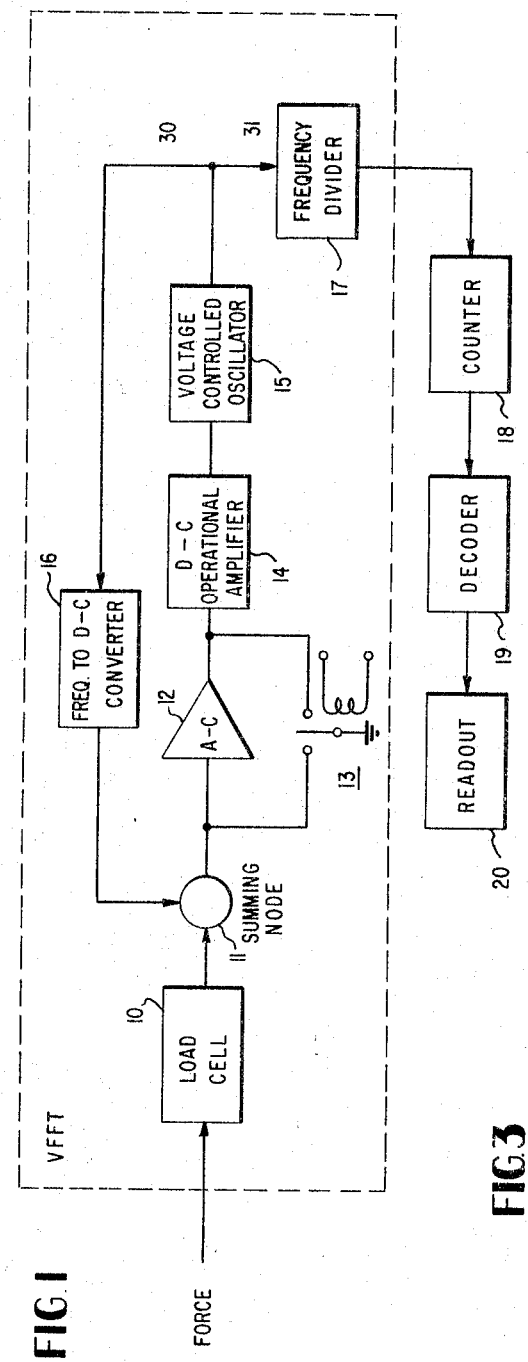
FIGURE 1 is a block diagram of the force measuring system.

Referring now to the drawings, wherein like reference numerals refer to like components in the several figures, there is illustrated in FIGURE 1 a load cell 10 which is suitably attached to a movable member (not shown) and which function as a transducer to provide a D.-C. output having a magnitude which is proportional to the force applied to the movable member. The D.-C. signal is fed through a summing node or junction 11 to an electromechanical chopper or vibrator 13 which converts the signal to an A.-C. waveform prior to amplification by A.-C. amplifier 12. The alternating output of the A.-C. amplifier is reapplied to chopper 13, functioning here as a rectifier, as will hereinafter be explained, to produce D.-C. pulses which are directed to D.-C. operational amplifier 14. The operational amplifier, in conjunction with associated capacitive feedback, amplifies and integrates the pulse train to produce a direct voltage which varies according to the polarity and magnitude of the pulses. This direct voltage controls the saw-toothed output frequency of voltage controlled oscillator 15, the frequency being proportional to the direct voltage and thus to the original voltage derived by the load cell 10.

The saw-toothed output of the voltage controlled oscillator is fed through feedback path 30 in which is located frequency to D-C converter 16. The converter 16 acts to produce a D-C output proportional to the frequency of the waveform applied at its input. This D-C output is then directed to summing node 11 in opposition to the D-C signal from load cell 10. A balance is thus obtained when the feedback voltage (D-C output of converter 16) is exactly equal and opposite to the load cell signal. The frequency of voltage controlled oscillator 15, which is maintained at that frequency at which the condition of balance exists by the holding action of D-C operational amplifier 14, is tapped off along path 31 and reduced by the operation of frequency divider 17 in accordance with the desired range of measurement. The closed loop system just described constitutes the variable frequency-fixed time circuit (V.F.F.T.), as denoted by the dotted enclosure of FIGURE 1, of the overall weighing system.

The output frequency of divider 17 is applied to a gated counter 18, having a preselected time base, which produces a visual indication of the frequency as well as a binary coded decimal (BCD) output. It is to be noted that each count represents one cycle per second (c.p.s.) which is equivalent to a preselected base weight, for example one pound, whereby a counter indication of 500 would represent a 500 c.p.s. signal applied to the counter and a weight of 500 pounds. In addition, it is often desirable to obtain a printed record of each individual weighing and an accumulated sum of a series of successive weighings. For this purpose, the BCD output of counter 18 is applied to a binary-to-digital decoder 19 which produces a digital signal suitable for printing by readout device 22 which may include, for example, an adding machine.

Power requirements for this system may be obtained from any suitable commercial A-C source, the output of which may be regulated and filtered by an A-C voltage regulator (not shown). The regulated A-C thus obtained is applied to individual closely regulated D-C supply units one of which is illustrated at 34 in FIGURE 2. A separate D-C supply is required for each load cell, as will hereinafter be explained, with additional D-C supplies providing operational power for the remainder of the individual units of the V.F.F.T. system. The counter, decoder, and readout units may utilize A-C power obtained from commercial A-C outlets.

Figure 2:
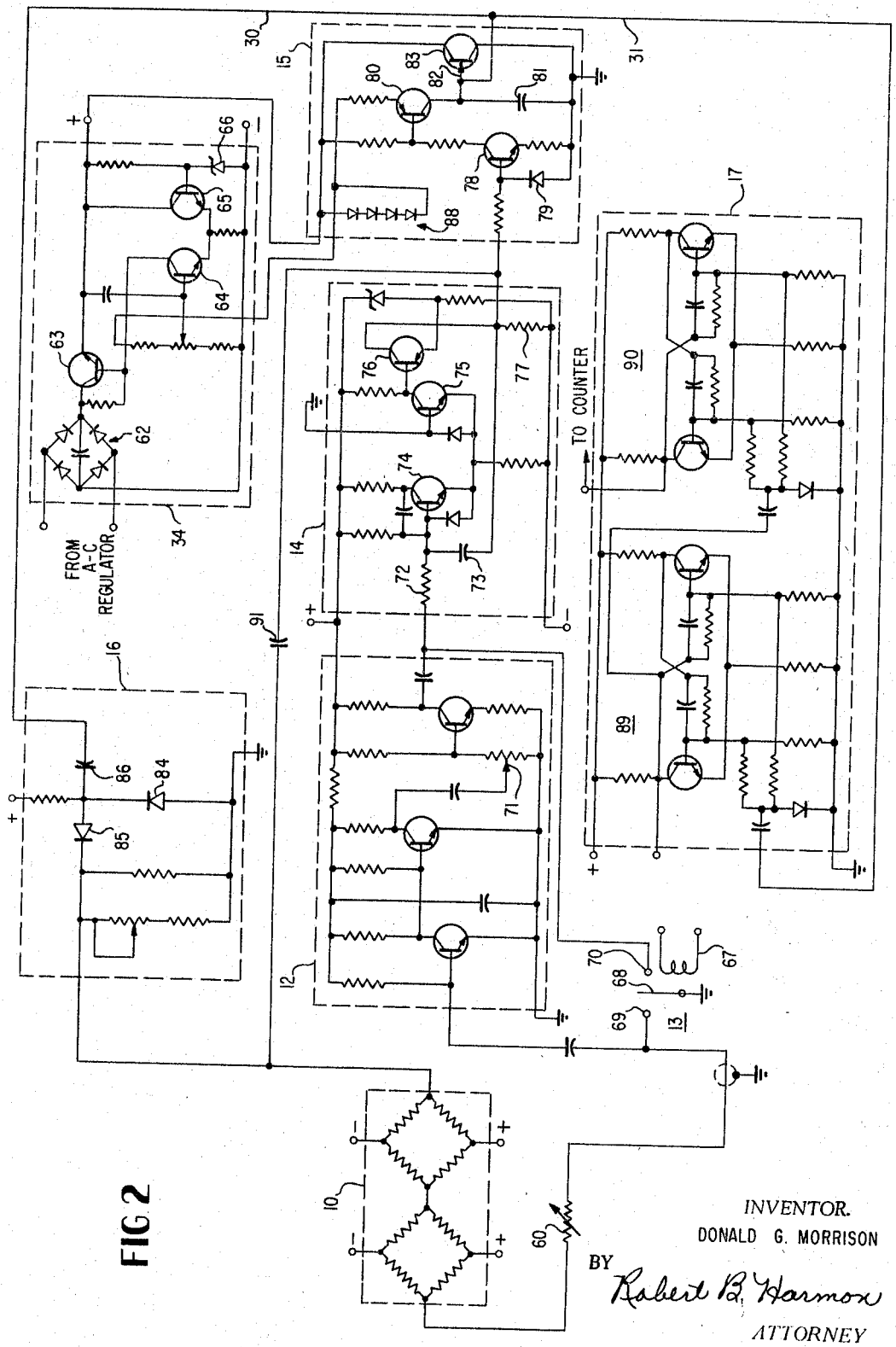
FIGURE 2 is a schematic diagram illustrating a portion of a preferred embodiment of the variable frequency-fixed time (V.F.F.T.) circuit designated by the dotted enclosure in FIGURE 1.

The component structure of the individual units comprising the V.F.F.T. system is illustrated by the schematic diagram of FIGURE 2. Referring to FIGURE 2, the load cell unit is indicated generally at 10. In this specific embodiment a pair of load cells is employed; however, the number of cells used in any particular arrangement will depend upon the desired physical configuration of the movable member to which they are attached. The load cells may be of a commercially available type, for example a bridge circuit including strain gauges and temperature compensating resistances. The weight applied to the movable member, to which the load cells are suitably attached, will cause an unbalance in the bridge circuitry thus providing a D-C signal that is proportional to the said weight. Potentiometers (illustrated for the sake of simplicity as variable resistance 60) are provided at the output of the floating load cell unit 10 to allow initial calibration of the load cell assembly; that is, for the desired system output in response to a preselected weight. The cells illustrated are connected in series circuit such that the output of each cell is added to the output of the remaining cells and thus a combined D-C signal is obtained. Specific operation and structure of these load cells is well known and will not be discussed further.

In order to prevent deviations in the D-C output signal vs. weight-applied characteristics of the load cells, a separate highly regulated D-C supply is utilized in conjunction with each cell. The transistorized power supply indicated generally at 34 is exemplary of the power units used to provide regulated D-C output voltage under varying load conditions. That is, it is necessary that the output of the D-C power supply remain constant irrespective of changes in the load to which power is supplied. To accomplish this end, the voltage obtained from the A-C regulator and transformer unit (not shown), connected to a commercial A-C supply, is applied to a bridge rectifier 62 the output of which is fed to transistor 63. A differential amplifier, comprising transistors 64 and 65 connected in common emitter configuration, compares the output voltage of the D-C supply to a fixed reference voltage provided by temperature compensated zener diode 66 which is connected across the base and emitter leads of transistor 65. Changes in load which would otherwise affect the D-C supply output are sensed by the differential amplifier and compensated for, for example, any tendency for the output voltage to increase will cause an increase in the emitter voltage of transistor 64 which in turn increases its collector current. This causes a reduction in the collector voltage of 64 and since the base of transistor 63 is connected to the collector of 64, its base voltage also decreases. The current flow through transistor 63 is thereby reduced to oppose the increase in output voltage. In this manner, the power supply is extremely sensitive to supply load variations and rapidly compensates for such variations. Each load cell has an identical power supply operated in conjunction therewith. Similar operation is provided by other D-C supply units providing power for other portions of the V.F.F.T. assembly.

The D-C voltage derived from the load cell unit is applied to A-C amplifier 12 through a low pass filter (not shown) and chopper 13. A suitable filter arrangement would consist of a capacitor to ground between resistors, for elimination of noise and undesirable spurious signals. Chopper 13 converts the D-C voltage to a substantially square wave A-C signal in the following manner:

The coil 67 of chopper 13 is connected across the output of a conventional driver oscillator (not shown) having a preselected output frequency, thus causing the chopper switch 68 to vibrate at a like frequency. Switch 68 therefore alternately grounds the input and output of A-C amplifier 12 as ground is successively applied to contacts 69 and 70, respectively. As the amplifier input is grounded, the D-C signal from the load cell is interrupted and effectively converted to an A-C square wave.

Amplifier 12 comprises three transistor stages of common emitter configuration. The A-C signal obtained from the chopper is fed successively through each stage; potentiometer 71 being used to provide gain adjustment. The amplified output signal, which is inverted because of the odd number of common emitter stages, is then reapplied to the chopper. In this case, as the chopper switch grounds the output of the amplifier, the A-C output signal is clamped to produce a series of D-C pulses having a magnitude and polarity dependent upon the value of the load cell output.

The D-C pulse train is applied to D-C operational amplifier 14 for amplification and integration. The differential amplifier structure of transistors 74 and 75 provides high gain and temperature stability along with rejection of undesired signals common to both transistors (i.e., common mode rejection). The single ended output of the differential amplifier is applied to transistor 76, an additional gain stage. Feedback capacitor 73 in conjunction with resistor 72 performs the integration of the D-C pulse train to provide a direct voltage level across output resistor 77 that varies according to the polarity and magnitude of the input pulses. Capacitor 73 also acts to maintain or hold its charge at the pre-existing level whereby a D-C level exists at the output of the operational amplifier when balance occurs.

The direct voltage output of amplifier 14 is applied to voltage controlled oscillator 15. Operation of the oscillator in conjunction with the D.-C. power supply (34, for example) and the frequency to D.-C. converter 16 is extremely important in the maintenance of overall linearity, stability, and temperature compensation. Hence, interaction of these three units will be described in combination.

Transistor stage 78 of oscillator 15 produces an inversion of the oscillator output frequency to provide the proper phase at feedback path 30, diode 79 protecting transistor 78 against negative biasing. The D.-C. voltage applied to transistor 80 controls its conduction and therefore gives the effect of a variable resistance having a magnitude dependent upon applied voltage. Conduction of transistor 80 affects the voltage appearing at the base of transistor 64 and thus ultimately affects the D.-C. supply output as well as the charging time of capacitor 81. Unijunction or double base transistor 83 undergoes a catastrophic breakdown at a fixed voltage appearing at its emitter lead 82. This fixed voltage is, however, dependent to some extent on the bias voltage provided by supply 34. As breakdown occurs, capacitor 81 discharges through the unijunction and provides across its terminals a linearly increasing sawtooth waveform having a normally constant peak magnitude and a frequency dependent on oscillator input voltage. However, since the rate at which capacitor 81 charges increases non linearly (i.e., less rapidly) with increasing oscillator input voltage, a reduction in voltage occurs at the base of transistor 64 and a compensating increase in D.-C. supply output which causes the breakdown of unijunction 83 to occur at a higher voltage level as oscillator input voltage increases.

The combination of nonlinearity in oscillator frequency and controlled variation in magnitude of the sawtooth exactly counteracts the reverse nonlinear characteristic of applied voltage-versus-current conduction, i.e., the dynamic impedance characteristic occurring in diodes 84 and 85 of the frequency to D.-C. converter 16. Such a nonlinear characteristic is present in all diodes. These two diodes alternately pass current as capacitor 86 is charged by the linearly increasing sawtooth and is discharged as the sawtooth falls sharply to zero. There is thus produced at the converter 16 output a D.-C. voltage, controlled by the frequency of the oscillator sawtooth output, interrupted by spikes having a time base equal to the short fall time of the sawtooth. These spikes are easily filtered by a conventional filter (not shown) prior to application of the D.-C. voltage in opposition to the D.-C. signal from the load cells at the summing node. When the opposing D.-C. voltage is equal in magnitude but opposite in polarity to the load cell voltage a balance occurs. The oscillator output frequency and of course the converter voltage are maintained at the balance condition by the previously described holding action of operational amplifier 14. A feedback capacitor 91 is connected between the outputs of amplifier 14 and converter 16 to provide an initial false balance (as actual balance is approached) and thus prevent hunting in the system. Overall balance has been consistently attained in less than one second.

Temperature compensation is provided by diode string 88 which is maintained at the same ambient temperature as diodes 84 and 85. Reduction in voltage drop across the latter two diodes (as occurs in all diodes) with increasing temperature is compensated by a similar reduction across the diode string, the diodes having similar temperature characteristics, which causes an increase in supply output voltage in a manner previously described in connection with regulation of supply voltage with variations in load. Thus the V.F.F.T. system maintains linearity, stability, and temperature compensation during its overall operation.

The output frequency of voltage controlled oscillator 15 is applied via conducting path 31 to frequency divider 17 which employs a pair of bistable multivibrator, or flip-flop, stages 89 and 90 to reduce the oscillator frequency by a predetermined factor to provide the desired range spread in the readout system. Gated counter 18 counts the cycles per second of the divider 17 output frequency and provides a binary coded decimal output.

Figure 3:
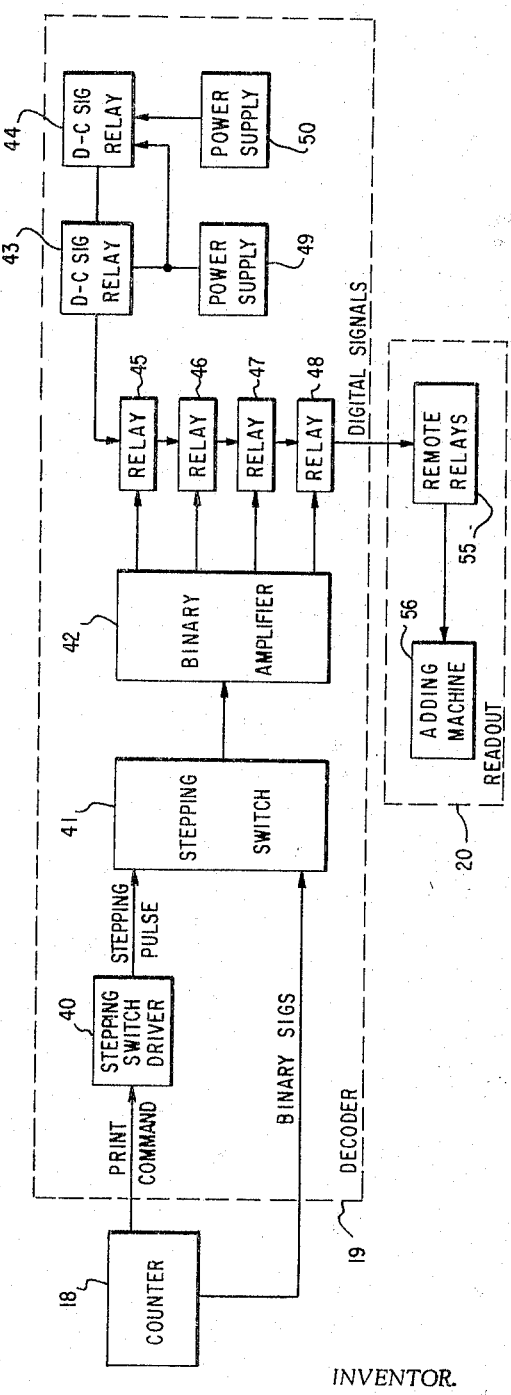
FIGURE 3 is a block diagram of one embodiment of the decoder assembly of FIGURE 1.

Referring now to FIGURE 3, which is a block diagrammatic illustration of the decoder assembly designated in FIGURE 1, the decoder generally designated at 20 is used to convert the BCD output of the counter to digital signals which are in turn applied to remote relays 55. To this end, the binary counter controls, by means of a command pulse, a stepping switch driver 40 which provides a stepping pulse to switch 41. In addition, the electronic counter generates binary signals which are directly applied to stepping switch 41. The switch passes the signals in four groups corresponding to the BCD output (for example, 1–2–2–4) to the binary amplifier 42, a four-stage assembly, each stage of which selects and amplifies a particular group of binary signals. In operation, as the stepping switch advances, the binary signals constituting group 1 are applied to stage 1 of the binary amplifier; the sequence continuing until each group of signals is amplified by the appropriate stage of the amplifier.

The amplifier 42 output is sequentially applied to relays 45, 46, 47 and 48; each of the relays corresponding to the particular stage of the amplifier from which its input signal is derived. Operation of the relays 45 through 48 inclusive in conjunction with power relays 43 and 44 provides a conversion of the BCD signals to a digital form before application thereof to the remote relays 55. The digital signal thus obtained is applied through the remote relays to a display unit, for example adding machine 56, which provides an indication of the weight under observation. An adding machine is effective to provide individual weighing indications while additionally allowing totaling of several successive weighing operations, but other types of display units may also be used, for example a recorder or an oscilloscope.

While a particular embodiment has been described in accordance with the patent statutes, it is obvious that various modifications may be devised, which would be within the scope of this invention, by those having ordinary skill in the art to which it pertains upon a reading of the above description. It is therefore desired that the invention be limited only by a liberal interpretation of the appended claims.

What is claimed and desired to be secured by United States Letters Patent is:

1. A force measuring system comprising means for generating a D-C signal proportional to the magnitude of the force applied to said system, means for translating said D-C signal to an A-C signal having a frequency proportional to the amplitude of said D-C signal, feedback means for converting said A-C signal to a direct voltage proportional to said frequency, means for applying said direct voltage in opposition to said D-C signal whereby a balance is obtained, and means for measuring said frequency as an indication of said force.

2. A force measuring system comprising transducer means responsive to the force to be measured for generating a direct electrical signal proportional thereto, first means for converting said direct signal to an alternating voltage of a frequency proportional to the amplitude of said direct signal, second means for converting said alternating voltage to a direct voltage proportional to said frequency, means for applying said direct voltage in opposition to said direct signal to obtain a null, and counter means for measuring said frequency as a measure of said force.

3. A force measuring system comprising a transducer for providing a first D-C signal proportional to a force applied thereto, first converter means for converting said first D-C signal to a series of D-C pulses, means for integrating said D-C pulses to produce a second D-C signal in accordance therewith, oscillator means connected to receive said second D-C signal and to produce an A-C signal having a frequency proportional to the amplitude of said second D-C signal, second converter means connected in feedback relation for converting said A-C signal to a direct voltage proportional to said frequency, means for applying said direct voltage in opposition to said first D-C signal to obtain a balance, said integrating means being effective to maintain said second D-C signal at the amplitude occurring at said balance, divider means connected to receive said A-C signal and to reduce the frequency thereof, counter means for measuring said reduced frequency and for providing a binary signal in accordance therewith, means for decoding said binary signal to produce a digital output in accordance therewith, and means for displaying said digital output as a measure of said force.

4. A weighing system comprising a load cell having a D-C output voltage proportional to a weight applied thereto, chopper means for converting said D-C voltage to an A-C signal, means for amplifying said A-C signal, said chopper means being further connected to receive and translate said amplified A-C signal into a series of D-C pulses, means for integrating said pulses to produce a varying D-C signal related thereto, oscillator means connected to receive said varying D-C signal and for producing a sawtooth voltage having a frequency proportional to the amplitude of said D-C signal, feedback means for converting said sawtooth voltage to a direct voltage having a magnitude proportional to said frequency, means for applying said direct voltage in opposition to said load cell D-C output voltage to produce a balance thereby, and means for measuring said frequency occurring at said balance as a measure of said weight.

5. A weighing system comprising a load cell connected to a movable member and producing a D-C voltage proportional to the weight applied to said member, chopper means for converting said D-C voltage to an alternating signal related thereto, means for amplifying said alternating signal, said chopper means connected to receive and translate said amplified alternating signal to a D-C pulse train, means for integrating said pulse train to produce a D-C signal in accordance therewith, oscillator means connected to receive said D-C signal and to generate an A-C voltage having a frequency proportional to the magnitude of said D-C signal, feedback means for converting said A-C voltage to a direct voltage having an amplitude proportional to said frequency, means for applying said direct voltage in opposition to said D-C voltage from said load cell whereby a balance is obtained, said integrating means being effective to maintain said D-C signal at the magnitude occurring at said balance and thereby to maintain said frequency at balance level, divider means for reducing said frequency occurring at said balance in accordance with a predetermined functional relationship, counter means for measuring said reduced frequency and for producing binary signals in accordance therewith, decoder means for converting said binary signals to a digital output, and means for displaying said digital output whereby a measurement of said weight is obtained.

6. The system according to claim 5 wherein said integrating means comprises a D.-C. differential amplifier having first and second inputs and a single output, a resistor connected to said first input, means for applying said pulse train to said first input through said resistor, said second input being grounded, a transistor amplifier connected to said single output, a feedback capacitor connected between the output of said transistor amplifier and said first input, said resistor and said feedback capacitor combining to integrate said pulse train, whereby said D.-C. signal produced by said integrating means varies in accordance with the magnitude and polarity of said pulse train.

7. The invention according to claim 6 wherein said oscillator means comprises a first transistor having base, emitter, and collector electrodes, means for applying said D.-C. signal to said base electrode to control the conduction of said first transistor, a charging capacitor in series with said collector electrode and having a charging rate dependent upon said conduction of said transistor, a unijunction transistor having an emitter electrode and two base electrodes, said emitter electrode of said unijunction transistor being connected between said collector electrode and said charging capacitor, said unijunction transistor having a breakdown characteristic which is a function of the voltage applied to the emitter electrode thereof whereby said breakdown is controlled by the charge on said capacitor, said capacitor discharging through said unijunction transistor at said breakdown, whereby the output across said capacitor is an A.-C. voltage having a frequency proportional to said D.C. signal.

8. The invention according to claim 7 wherein said feedback means comprises an input capacitor, a pair of diodes each having a cathode and an anode, one of said diodes having the cathode thereof connected to said input capacitor and the anode thereof connected to ground, an output resistor, the other of said diodes having the anode thereof connected to said input capacitor and the cathode thereof connected to said output resistor, means for applying said A-C voltage from said oscillator means to said input capacitor to control the charging and discharging rates of said input capacitor in accordance with said frequency, said diodes providing rectification of the alternating voltage across said input capacitor, whereby said direct voltage output obtained across said output resistor has a magnitude proportional to said frequency.

9. A weighing system comprising a load cell attached to a movable member, said load cell generating a D-C voltage proportional to the weight applied to said movable member, chopper means for converting said D-C voltage to an alternating signal related thereto, means for amplifying said alternating signal, said chopper means further connected to receive and convert said amplified alternating signal to a D-C pulse train, means for integrating said pulse train to produce a D-C signal in accordance therewith, oscillator means connected to receive said D-C signal for generating an A-C voltage having a frequency proportional to the magnitude of said D-C signal, feedback means for converting said A-C voltage to a direct voltage having a magnitude proportional to said frequency, means for applying said direct voltage in opposition to said load cell D-C voltage whereby a balance is derived, feedback capacitor means connected between the output of said integrating means and the output of said feedback means to stabilize said system as balance is approached, said integrating means being effective to maintain said D-C signal at the magnitude existing at said balance and thereby to hold said frequency occurring at the balance condition, and means for measuring said frequency whereby a measurement of said weight is obtained.

10. The invention according to claim 9 wherein said integrating means comprises a D-C differential amplifier having first and second inputs and a single output, a resistor connected to said first input, means for applying said pulse train to said first input through said resistor, said second input being grounded, a transistor amplifier connected to said single output, a feedback capacitor connected between the output of said transistor amplifier and said first input, said resistor and said feedback capacitor combining to integrate said pulse train, whereby said D-C signal produced by said integrating means varies in accordance with the magnitude and polarity of said pulse train.

11. The invention according to claim 10 wherein said oscillator means comprises a first transistor having base, emitter, and collector electrodes, means for applying said D-C signal to said base electrode to control the conduction of said first transistor, a charging capacitor in series with said collector electrode and having a charging rate dependent upon said conduction of said transistor, a unijunction transistor having an emitter electrode and two base electrodes, said emitter electrode of said unijunction transistor being connected between said collector electrode and said charging capacitor, said unijunction having a breakdown characteristic which is a function of the voltage applied to the emitter electrode thereof whereby said breakdown is controlled by the charge on said capacitor, said capacitor discharging through said unijunction transistor at said breakdown, whereby the output across said capacitor is an A-C voltage having a frequency proportional to said D-C signal.

12. The invention according to claim 11 wherein said feedback means comprises an input capacitor, a pair of diodes each having a cathode and an anode, one of said diodes having the cathode thereof connected to said input capacitor and the anode thereof connected to ground, an output resistor, the other of said diodes having the anode thereof connected to said input capacitor and the cathode thereof connected to said output resistor, means for applying said A-C voltage from said oscillator means to said input capacitor to control the charging and discharging rates of said input capacitor in accordance with said frequency, said diodes providing rectification of the alternating voltage across said input capacitor, whereby said direct voltage output obtained across said output resistor has a magnitude proportional to said frequency.

13. The invention according to claim 12 wherein a regulated D-C power supply is connected to said oscillator means to compensate for nonlinearities in the dynamic impedance characteristics of said feedback means diodes, said power supply comprising means for comparing an input voltage to a fixed reference voltage and for producing an output voltage in accordance with said reference voltage, zener diode means for providing said fixed reference voltage, means for applying to said comparison means a rectified input voltage, means for superimposing upon said rectified input voltage a voltage dependent upon the conduction current of said first transistor in said oscillator means whereby said power supply is partially driven by said first transistor, and means for applying said output voltage of said comparison means to one of said base electrodes of said unijunction transistor whereby said breakdown characteristic thereof is partially controlled by said conduction current.

14. The invention according to claim 13 wherein a string of diodes is connected across input and output of said comparison means to provide temperature compensation for said pair of diodes of said feedback means, said diode string and said diode pair being placed in the same physical environment and having similar voltage drop-versus-temperature characteristics, means for superimposing the voltage drop of said diode string upon said rectified input voltage to said comparison means whereby changes in voltage drop with temperature across said diode string are sensed and counteracted by said comparison means.

15. A force measuring system comprising load cell means attached to a movable member for generating a D-C voltage proportional to a force applied to said movable member, means for converting said D-C voltage to a D-C pulse train proportional thereto, means for integrating said pulse train to produce a D-C signal relating thereto, oscillator means connected to receive said D-C signal and to produce a sawtooth voltage having a frequency proportional to the magnitude of said D-C signal, feedback means for converting said sawtooth voltage to a direct voltage having a magnitude proportional to said frequency, means for applying said direct voltage in opposition to said load cell D-C voltage whereby said direct voltage and said D-C voltage are balanced out, feedback capacitor means connected between the output of said integrating means and the output of said feedback means to stabilize said system at balance, said integrating means being effective to hold said D-C waveform existing at said balance and thereby maintain said sawtooth voltage frequency occurring at the balance condition, means for measuring said frequency and for producing an output signal in accordance therewith, and display means connected to receive said output signal and to display the magnitude thereof whereby a measurement of said force is obtained.

References Cited

UNITED STATES PATENTS

| | | | |
|---|---|---|---|
| 2,936,165 | 5/1960 | Thorsson | 177—211 |
| 3,063,635 | 11/1962 | Gordon | 235—151 |
| 3,089,097 | 5/1963 | Bell | 330—9 |
| 3,105,940 | 10/1963 | Bell et al. | 328—132 |
| 3,116,801 | 7/1964 | Bauder et al. | 177—210 |
| 3,158,822 | 11/1964 | Brechling | 331—111 |
| 3,173,107 | 3/1965 | Scharff et al. | 331—111 |
| 3,173,503 | 3/1965 | Karlen | 177—211 X |
| 3,182,268 | 5/1965 | Burwen | 330—10 |
| 3,186,504 | 6/1965 | Van Wilgen | 177—210 |

FOREIGN PATENTS

| | | |
|---|---|---|
| 622,581 | 12/1935 | Germany. |
| 916,110 | 6/1961 | Great Britain. |

RICHARD B. WILKINSON, *Primary Examiner.*

LEO SMILOW, LOUIS J. CAPOZI, *Examiners.*

G. H. PORTER, R. S. WARD, *Assistant Examiners.*